United States Patent [19]

Kouyama

[11] Patent Number: 4,685,694
[45] Date of Patent: Aug. 11, 1987

[54] STEERING APPARATUS OF VEHICLES

[75] Inventor: Mikihiro Kouyama, Kawagoe, Japan

[73] Assignee: Honda Giken Kogyo Kabushiki Kaisha, Tokyo, Japan

[21] Appl. No.: 760,795

[22] Filed: Jul. 31, 1985

[30] Foreign Application Priority Data

Aug. 7, 1984 [JP] Japan .............................. 59-120646[U]

[51] Int. Cl.⁴ ............................................. B62K 21/00
[52] U.S. Cl. ...................................... 280/270; 280/263; 280/274
[58] Field of Search ............... 280/270, 274, 276, 263, 280/279, 281 LP

[56] References Cited

U.S. PATENT DOCUMENTS

| 4,089,556 | 5/1978 | Stobar | 280/289 S |
| 4,108,460 | 8/1978 | Silva, Jr. | 280/281 LP |
| 4,540,189 | 9/1985 | Tanaka | 280/270 |

Primary Examiner—John J. Love
Assistant Examiner—Donn McGiehan
Attorney, Agent, or Firm—Armstrong, Nikaido, Marmelstein & Kubovcik

[57] ABSTRACT

In a vehicle, such as a motor cycle, motor scooter, etc., including a driver seat located backward of a headpipe, a handle supporting portion is projected backward from the headpipe, a handle is pivotably mounted on a rear end portion of this handle supporting portion. And, this handle is connected to a steering stem penetrating the headpipe through an angle increasing mechanism. According to the present invention, since a comparatively large space formed between the headpipe and the driver seat is available, a driver can drive the vehicle in a comfortable sit-in style. A fairing member which fully covers the front portion of the vehicle from its front surface to its side surfaces can be mounted without interfering with the handle. Also, the fairing member can be arranged so as to be small in wind pressure resistance.

7 Claims, 5 Drawing Figures

STEERING APPARATUS OF VEHICLES

BACKGROUND OF THE INVENTION

This invention relates to two-wheel or three-wheel vehicles, such as motorcycles, scooters, etc., which includes a driver seat located backward of a headpipe, and more particularly to a steering apparatus to be used for such vehicles.

In a conventional two-wheel or three-wheel vehicle, such as motorcycle, motor scooter, etc., a headpipe is mounted on a front portion of a vehicle body frame, and a steering stem connected to a front fork supporting a front wheel is pivotably supported by the headpipe. A handle is mounted on an upper portion of the steering stem. The front wheel is steered by the handle. However, in a vehicle having such a conventional steering apparatus as mentioned, mounting position of the handle is restricted by the location of the headpipe. Accordingly, a driver sitting on the driver seat is also restricted in his posture for driving the vehicle. That is, if the driver sits in the driver seat in a comfortable sit-in style as he does when he drives a car, the handle becomes too far to reach by hand.

In view of the above, there is proposed a steering apparatus in Japanese Laid-open Patent Publication (Kokai Tokkyo Koho) No. 58-128981, wherein mounting position and mounting angle of a handle can be determined arbitrarily in a two-wheel vehicle and a three-wheel vehicle. In this steering apparatus, a L-shaped stay projecting upward is mounted on a front surface of an intermediate portion of a headpipe, which pivotably supports a first steering stem connected to a front fork. A holding cylinder is pivotably attached to one end portion of this supporting stay. The holding cylinder permits a second steering stem to pivotably penetrate therethrough. And, the second steering stem is fixed at the rear end portion with a bar handle. An arm fixed to a front end portion of the second steering stem is connected to a top plate fixed to an upper end portion of the first steering stem through a rod and a ball joint.

However, in such a steering apparatus proposed, since the supporting stay, the holding cylinder, and various accessories thereof are projected forward of the head pipe, it is difficult to mount fairing members, such as, wind screen, handle cover, front cover, etc., at this location. Even if the fairing members are somehow mounted, they are obliged to the located far from the headpipe in the forward direction. This means that they are located remote from a driver. In order to obtain a sufficient effect as fairings, they are required to be made large in size. However, large fairing members are not desirable, since they invite increase of air resistance.

Generally, in a vehicle having a handle, there is such a tendency as that the handle and the fairings are often interferred with each other, when the handle is operated. In order to overcome the foregoing inconvenience, the fairings are required to include some adequate means such as escape, etc.

SUMMARY OF THE INVENTION

It is therefore an object of the present invention to provide a steering apparatus, wherein a driver can drive a vehicle in a comfortable sit-in style.

Another object of the invention is to provide a steering apparatus, wherein a headpipe is given a sufficient caster angle.

A further object of the invention is to provide a steering apparatus, wherein a wheel can be given with large steering angles by small rotary angles of a handle.

A still further object of the invention is to provide a steering apparatus, wherein fairing members such as wind screen, cover for covering the handle portion, front cover, etc. can be easily mounted on the front.

An even further object of the invention is to provide a steering apparatus, wherein the fairing members are made small in size, so that running resistance of a vehicle can be reduced.

An additional object of the invention is to provide a steering apparatus, wherein no interference is occurred between a handle and fairing members, when a handle is operated.

To achieve the above objects, in the present invention, a head pipe is integrally attached with a handle supporting portion projecting backward, the handle supporting portion being pivotably attached with a handle, the handle and a steering stem penetrating the headpipe being interconnected through an angle increasing mechanism in such a manner as that rotary angles of the steering stem become larger with respect to rotary angles of the handle.

According to the present invention, since a large space is made available between the headpipe and a driver seat, a driver can drive a vehicle sitting in a driver seat in a comfortable sit-in style stretching his legs forward, and the headpipe can be given sufficient caster angles.

Also, since the steering apparatus of the present invention includes no members which project forward than the head pipe, a fairing can be easily mounted. Moreover, employment of such a sit-in style as mentioned above makes the height of the seat low. Accordingly, the whole height of the fairing can be made low, thereby reducing wind pressure resistances when running.

Furthermore, in the present invention, since the handle and steering stem are connected with each other through the angle increasing mechanism, movement of the handle when in operation is comparatively small. Accordingly, the handle does not contact to the front cover and the fairing, nor is interferred with them. Therefore, a fairing can be provided in such a manner as to fully cover the front portion of the vehicle from the front surface to the side surfaces. Also, the front cover and the fairing can be located in a position near to the driver, and made comparatively narrow in width, so that running resistance can be reduced.

DETAILED DESCRIPTION OF THE EMBODIMENTS

Figure 1:
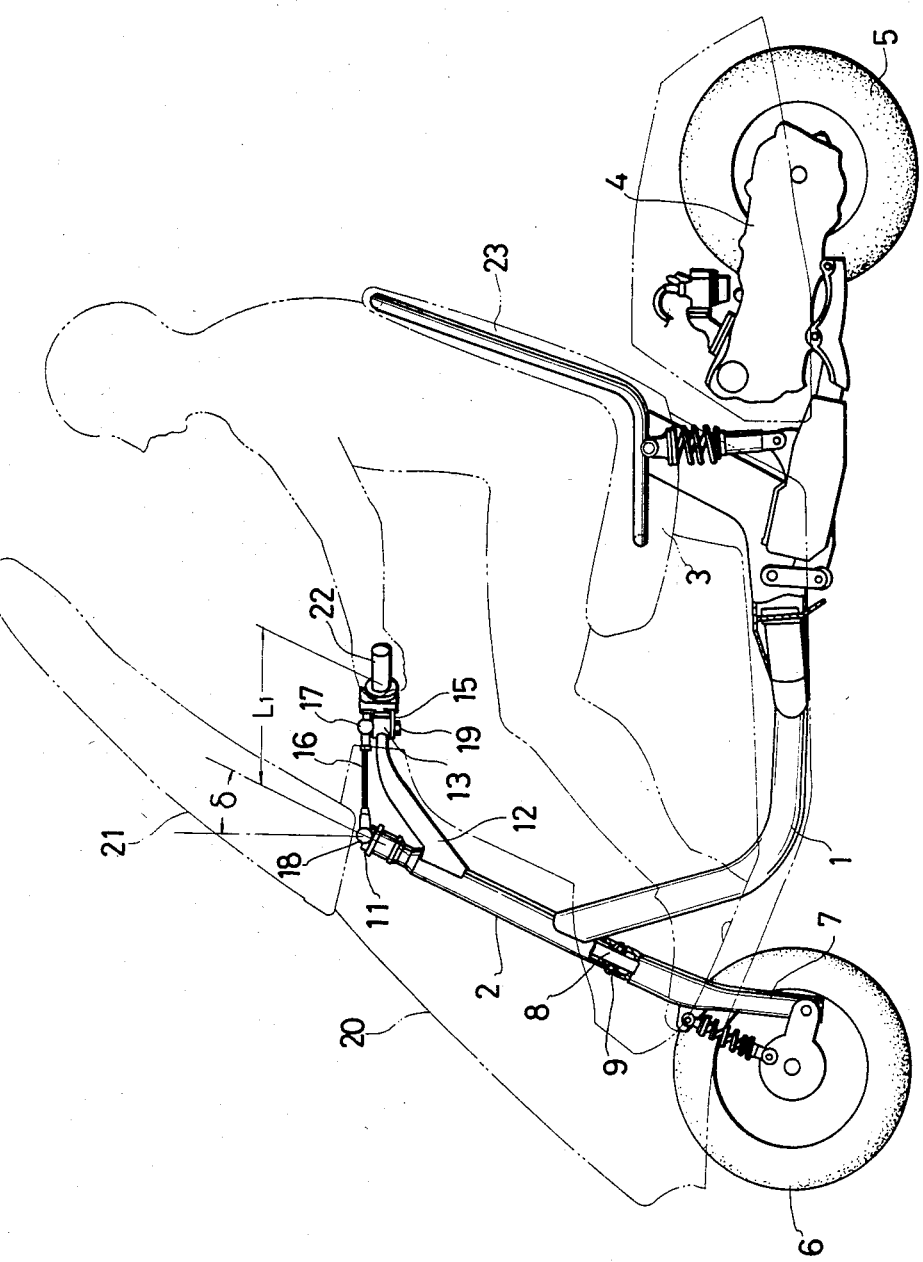
FIG. 1 is a side view of a three-wheel vehicle including a steering apparatus according to the present invention.
Figure 2:
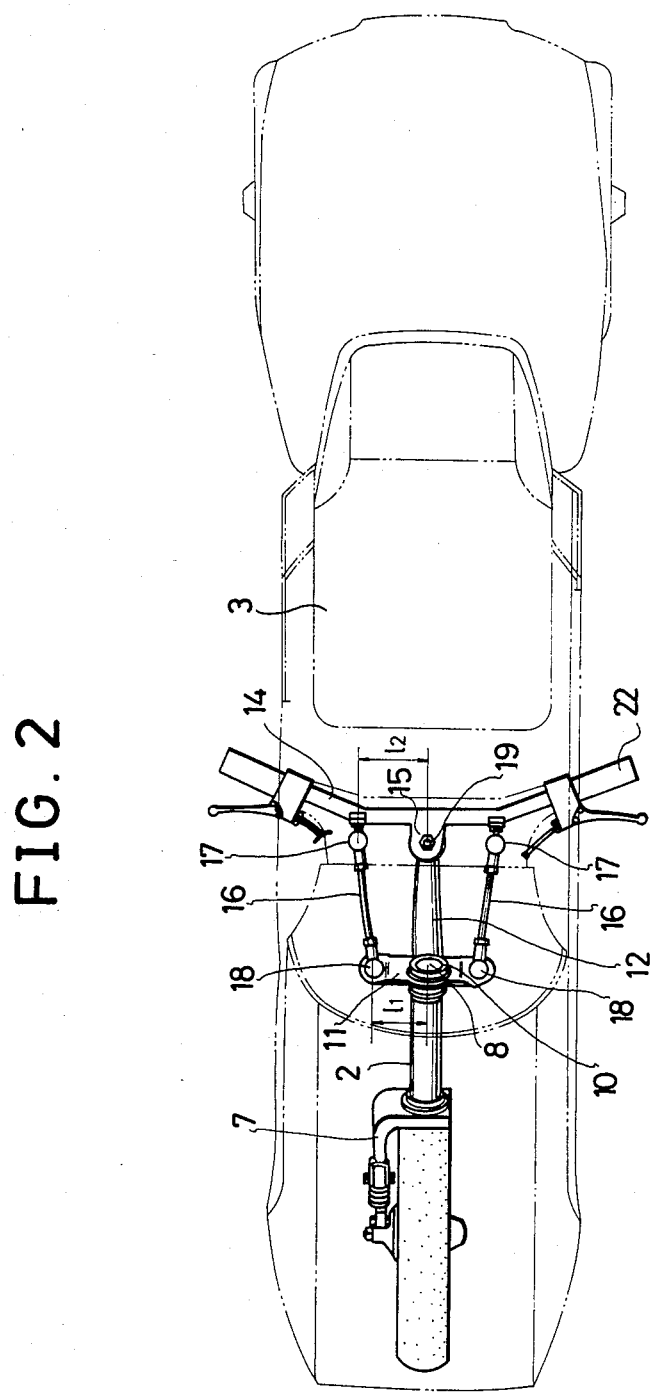
FIG. 2 is a plan view of the above.
Figure 3:
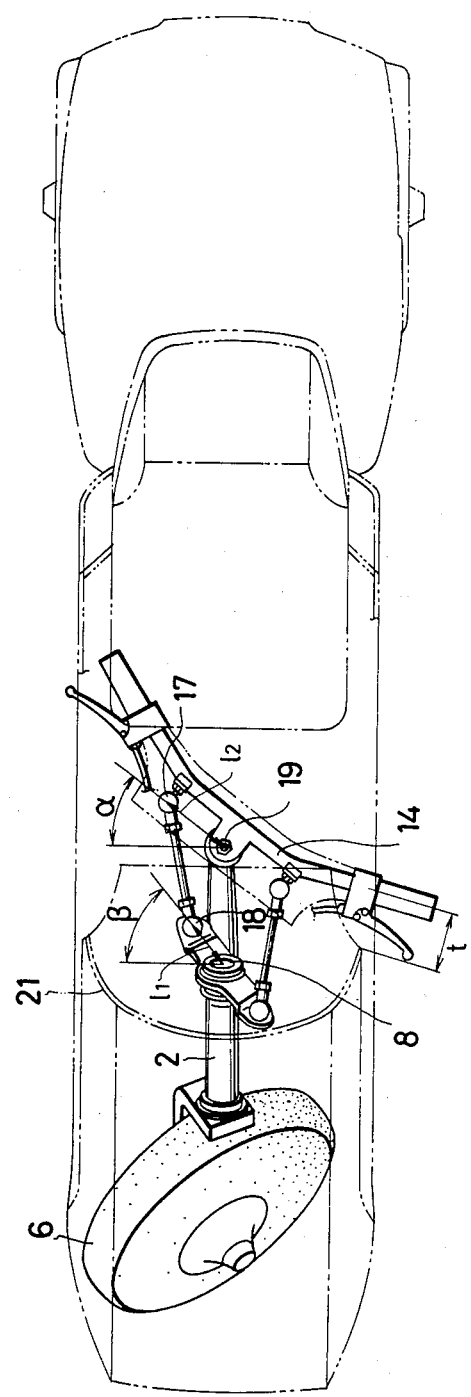
FIG. 3 is a plan view showing each part of the steering apparatus when steering.

FIGS. 1 through 3 illustrate one embodiment of the present invention, wherein a steering apparatus of the present invention is applied to a scooter-type three-wheel vehicle. FIG. 1 is its side view, and FIG. 2 is its plan view. Reference numeral 1 denotes a frame, the front portion of which forms a headpipe 2. The vehicle body frame 1 is mounted with a seat 3 on an upper portion of its rear portion. A power unit 4 is oscillatably mounted on a lower portion of the vehicle body frame 1. The power unit 4 is connected with a pair of right and left rear wheels 5 through a transmission apparatus.

A front wheel 6 is supported by a lower portion of a front fork 7 forming a suspension. The front fork 7 is attached at its upper end portion with a steering stem 8 projecting therefrom. The steering stem 8 is permitted to penetrate through the headpipe 2, and is pivotably supported with respect to the headpipe 2 at its upper and lower end portions by bearings 9. The upper end portion of the steering stem 8 forms a threaded portion projecting from the headpipe 2. A top plate 11 is fastened tight to this threaded portion by a nut 10.

The headpipe 2 is inclined backward with respect to the plumb line and includes a caster angle $\delta$.

The headpipe 2 is integrally fixed with a front end of a handle supporting portion at its upper rear surface by welding, etc. The handle supporting portion 12 is extended backward from the headpipe 2. The handle supporting portion 12 is provided at its rear end portion with a supporting collar 13. Reference numeral 14 denotes a handle, from a central portion of which a mounting bracket 15 is projected. By mounting this mounting bracket 15 to the supporting collar 13 through a pivot shaft 19, the handle 14 is pivotally attached to the handle supporting portion 12.

The handle 14 and the top plate 11 are connected with each other by a pair of right and left connecting rods 16. While, each of the respective connecting rods 16, 16 and the handle 14 are interconnected through ball joints 17, 17, respectively, and each of the connecting rods 16, 16 and the top plate 11 are interconnected through second ball joints 18, 18, respectively. In this way, a link mechanism is formed between the handle 14 and the top plate 11. Accordingly, when the handle 14 is caused to pivot about the pivot shaft 19, the top plate 11 is also pivoted about the axis of the headpipe 2. As a result, the front wheel 6 is steered through the steering stem 8 and the front fork 7. As will be described, the distance $l_2$ between the pivot shaft 19 and the ball joint 17 is formed larger than the distance $l_1$ between the steering stem 8 and the second ball joint 18. Accordingly, pivot angle of the top plate 11 becomes large with respect to that of the handle 14. In this way, the foregoing link mechanism forms an angle increasing mechanism.

The front of the headpipe 2 is covered with a front cover 20. A fairing 21 for wind shield is provided at an upper portion of the front cover 20.

Since the present embodiment is such constituted as described above, a grip 22 of the handle 14 is located in a position spaced apart backwardly from the headpipe 2. Accordingly, the driver can drive the vehicle sitting in the driver seat 3 in a comfortable sit-in style leaning his back on a back supporter 23 and stretching his legs forward. Since the height of the driver becomes comparatively low due to the foregoing arrangement, the fairing 21 can also be disposed low in height, thereby reducing running resistance.

FIG. 3 is a plan view illustrating each portion of the steering apparatus at a time when the handle is turned rightwardly in the present embodiment. As described in the foregoing, the distance $l_1$ between the steering stem 8 and the ball joint 18, and the distance $l_2$ between the pivot shaft 19 and the ball joint 17 are set as such that they satisfy the relation $l_2 > l_1$. Accordingly, the pivot angle $\beta$ of the steering stem 8 becomes larger with respect to the pivot angle $\alpha$ of the handle 14. Accordingly, the pivot angle of the handle 14 which is necessary for rendering a certain steering angle to the front wheel 6 is comparatively small. Due to the foregoing reason, together with another reason that the pivotally attaching point of the handle 14 is located in a position backward of the steering stem 8 as described, even if the front wheel 6 is steered up to its maximum angles, there still remains a space t between the fairing 21 and the handle 14. Therefore, the configuration of the fairing 21 may be formed so as to fully cover the front portion of the driver in order to produce its complete functions. Also, even if the fairing 21 is integrally mounted on the vehicle body, it will not interfere with the handle 14. Otherwise, by locating the fairing 21 in a position nearer to the driver, the width required to protect the driver from wind pressure, etc. becomes comparatively narrow, so that the dimension of the fairing 21 can be formed small to reduce running resistance. Although the embodiment shown in the figure includes a bar-type handle, the handle may take any other shape as long as it is long from side to side and includes grip portions each at both sides thereof.

Figure 4:
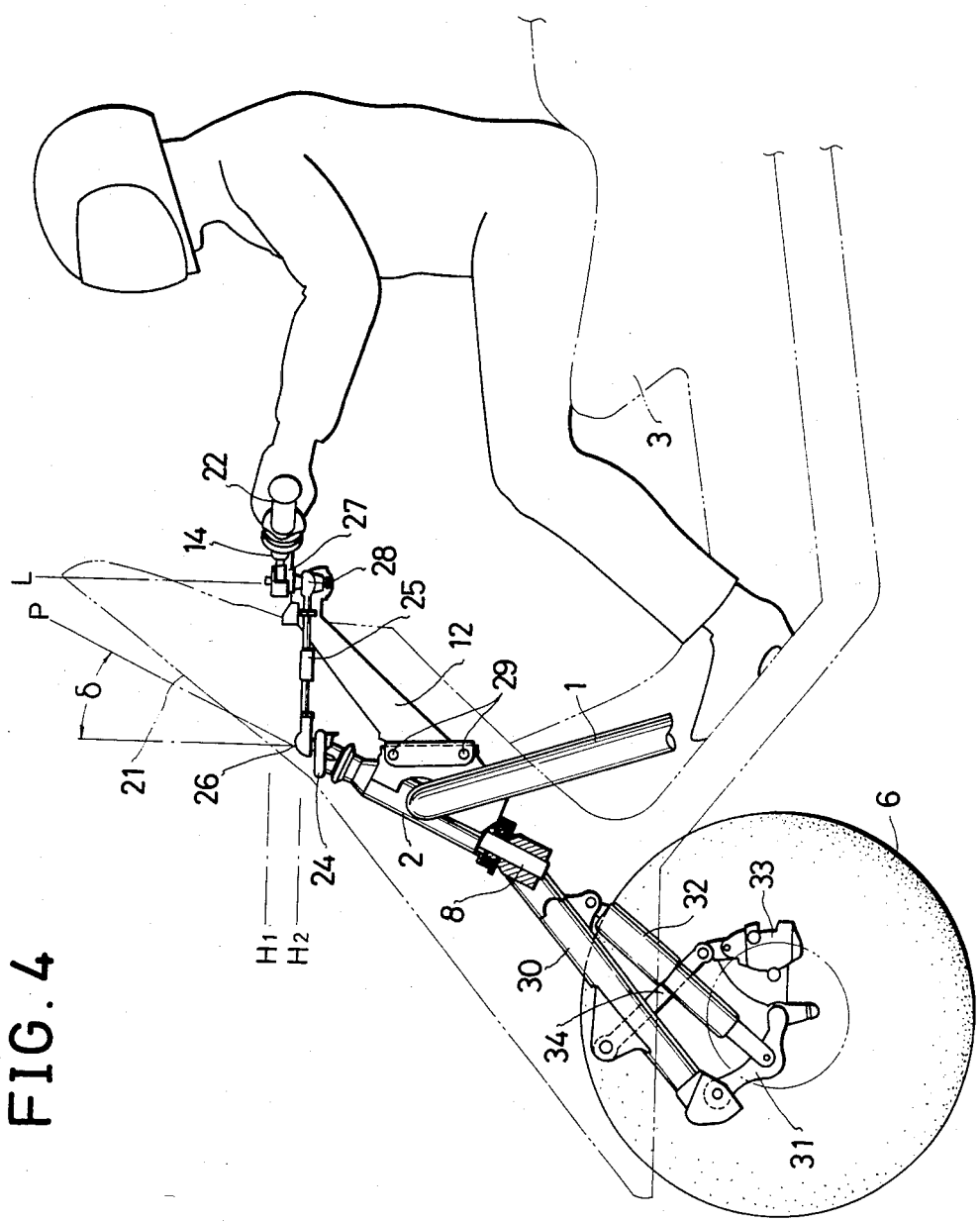
FIG. 4 is a partial side view of a three-wheel vehicle according to another embodiment of the present invention.
Figure 5:
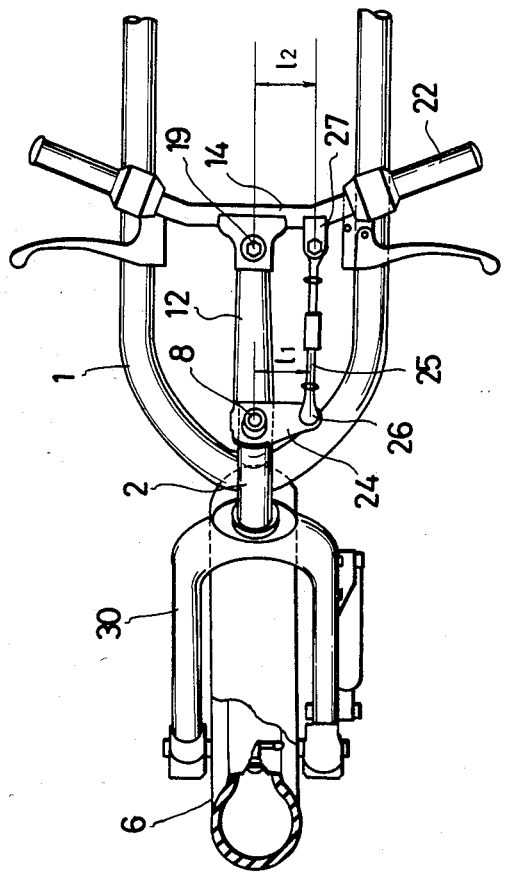
FIG. 5 is a plan view of the above.

FIGS. 4 and 5 illustrate another embodiment of the present invention, wherein parts similar to those in FIGS. 1 through 3 are denoted by like reference numerals. In this second embodiment, a top plate 24 corresponding to the top plate 11 in the preceding embodiment is extended only to the left side. A tip portion of the top plate 24 is connected with a front end of a connecting rod 25 through a ball joint 26. Accordingly, only one connecting rod is provided at one side in this embodiment. The rear end of the connecting rod 25 is connected to the under side of a fitting piece 27 extending forward from a left side portion of the handle 14 through a ball joint 28. Accordingly, a positional height $H_2$ of the connecting rod 25 is lower than a positional height $H_1$ of the handle 14.

Since the angle increasing mechanism of this second embodiment includes only one connecting rod 25 as described, the pivot angle of the top plate is not restricted by interactions of the pair of right and left connecting rods. Accordingly, the handle 14 and the top plate 24 can be given large rotary angles. Since the headpipe 2 includes a caster angle $\delta$, and the axis P of the steering stem 8 and the axis L of the pivot shaft 19 are not in a parallel relation with each other, in the case the top plate and the handle are interconnected by the pair of right and left connecting rods, the connecting rods move up and down while inclining in the opposite directions with each other during steering operation, and interfere with each other through the top plate. By this, the pivot angle of the top plate is restricted. Also, since the connecting rod 25 is located in a position lower than the handle 14, the headpipe 2 can also be made low corresponding thereto. Accordingly, the fairing 21 can be located in a position nearer to the driver side. Or, a sufficient space for installing such equipments as meters, etc. can be obtained.

In the second embodiment, the handle supporting portion 12 is fixed to the headpipe 2 by bolts 29. A front fork 30 is connected to the front end of an arm member 31 extending forward from the axle, thereby forming a trailing link-type suspension. Reference numeral 32 denotes a cushion unit interposed between an intermediate portion of the arm member 31 and an upper portion of the front fork 30. Reference numeral 33 denotes a brake caliper connected to the front form 30 through a torque rod 34.

What is claimed is:

1. A steering apparatus for a vehicle having a driver seat located substantially between a front wheel and a motor comprising:
   a head pipe affixed to a vehicle frame;
   a steering stem coaxially positioned within said head pipe;
   a handle supporting member projecting rearwardly in the inside of said head pipe means;
   a handle pivotally mounted on the top portion of said handle supporting member;
   a top plate mounted on the top of said steering stem; and
   a connecting rod directly connecting said handle and said top plate.

2. A steering apparatus according to claim 1, wherein said headpipe is inclined with respect to the plumb line.

3. A steering apparatus according to claim 1, wherein said steering stem supports at its lower end portion of a front wheel through a front fork.

4. A steering apparatus according to claim 1, wherein said angle increasing mechanism comprises a top plate fixed to the upper end portion of said steering stem and extending in the right and left directions therefrom; and a pair of right and left connecting rods, both ends of said right and left connecting rods being pivotally connected to said top plate and said handle respectively, a distance from a connecting point of said connecting rods with respect to said top plate to the axis of said steering stem being arranged shorter than a distance from a connecting point of said connecting rods with respect to said handle to a pivot point of said handle with respect to said handle supporting portion.

5. A steering apparatus according to claim 1, wherein said angle increasing mechanism comprises a top plate fixed to the upper end portion of said steering stem and extending only either in the right or left side therefrom; and a connecting rod, a front end portion of said connecting rod being pivotally connected to an outer end portion of said top plate, a rear end portion of said connecting rod being pivotably connected to the same side of said handle, a distance from a connecting point of said connecting rod with respect to said top plate to the axis of said steering stem being arranged shorter than a distance from a connecting point of said connecting rod with respect to said handle to a pivot point of said handle with respect to said handle supporting portion.

6. A steering apparatus according to claim 4 or claim 5, wherein said angle increasing mechanism is located in a position lower than said handle.

7. A steering apparatus according to claim 1 further comprising a front cover portion of said fairing enclosing said head pipe.

* * * * *